United States Patent [19]

Allred

[11] Patent Number: 4,752,791
[45] Date of Patent: Jun. 21, 1988

[54] CAMERA MOUNT

[76] Inventor: Charles N. Allred, 3476 Springrun Dr., Decatur, Ga. 30032

[21] Appl. No.: 78,915

[22] Filed: Jul. 28, 1987

[51] Int. Cl.⁴ .............................................. G03B 29/00
[52] U.S. Cl. ....................................................... 354/81
[58] Field of Search .................................. 354/81, 293

[56] References Cited

U.S. PATENT DOCUMENTS 4,420,238 12/1983 Felix ....................................... 354/81
4,621,786 11/1986 Greenlee ............................ 354/81 X Primary Examiner—Michael L. Gellner
Attorney, Agent, or Firm—Newton, Hopkins & Ormsby

[57] ABSTRACT

An improved nose mount is disclosed that permits smooth and accurate pan and tilt of the camera by remote control and also provides an effective means for reducing to a minimum the vibration of a motion picture of TV camera mounted on a helicopter or other platform. The camera mount includes an open rectangular frame depended from the aircraft and shock braced therefrom; a first inner mount of open form gimballed to the frame about a vertical axis and an inner camera mount gimballed to the first mount about a horizontal axis. The camera mount is shock mounted to the inner mount. Separate drive motors are provided for the two axes and a remote control and display are provided inside the cockpit. The camera mount is roll-stabilized to keep it level during turns of the helicopter.

17 Claims, 5 Drawing Sheets

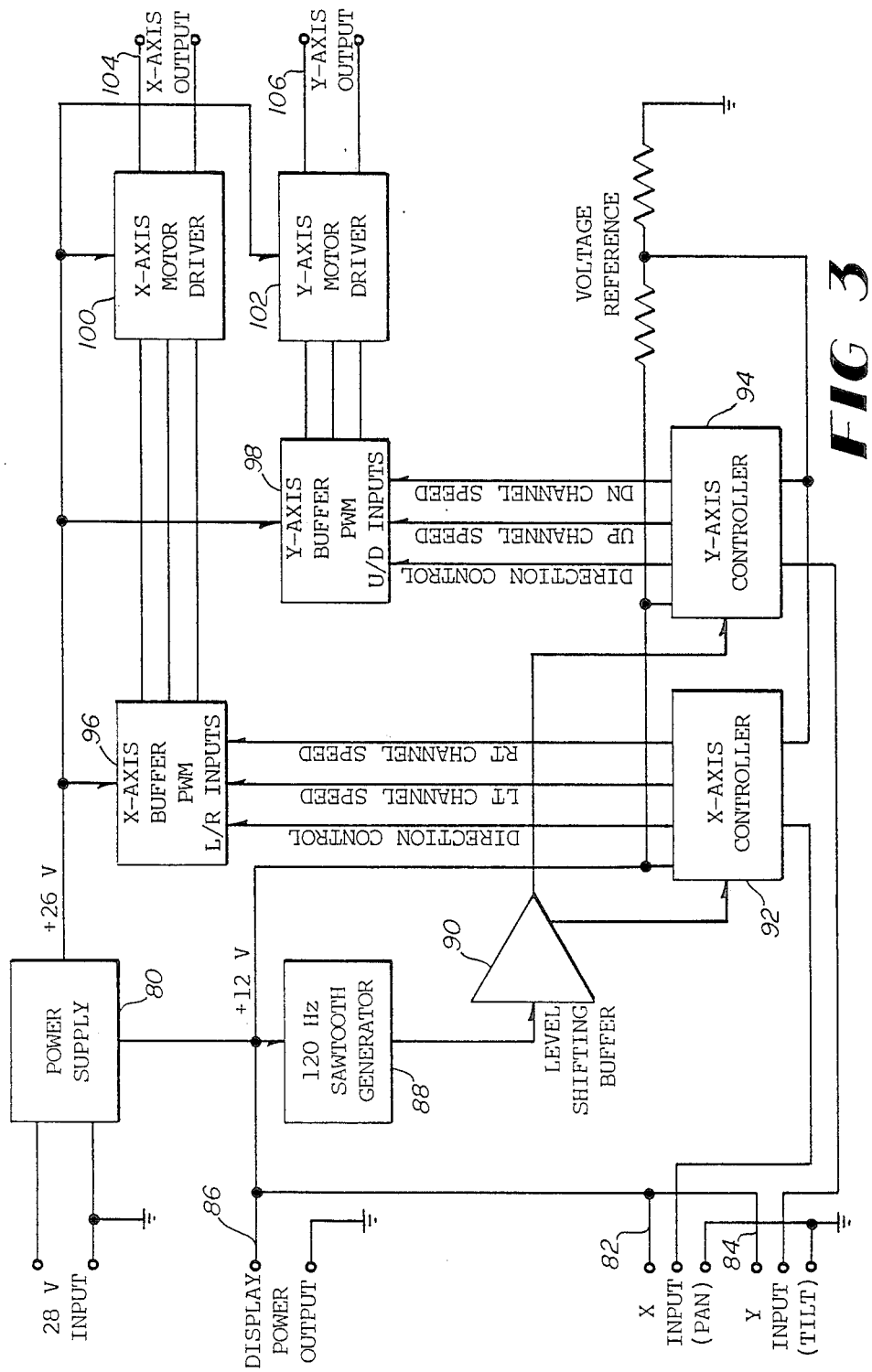

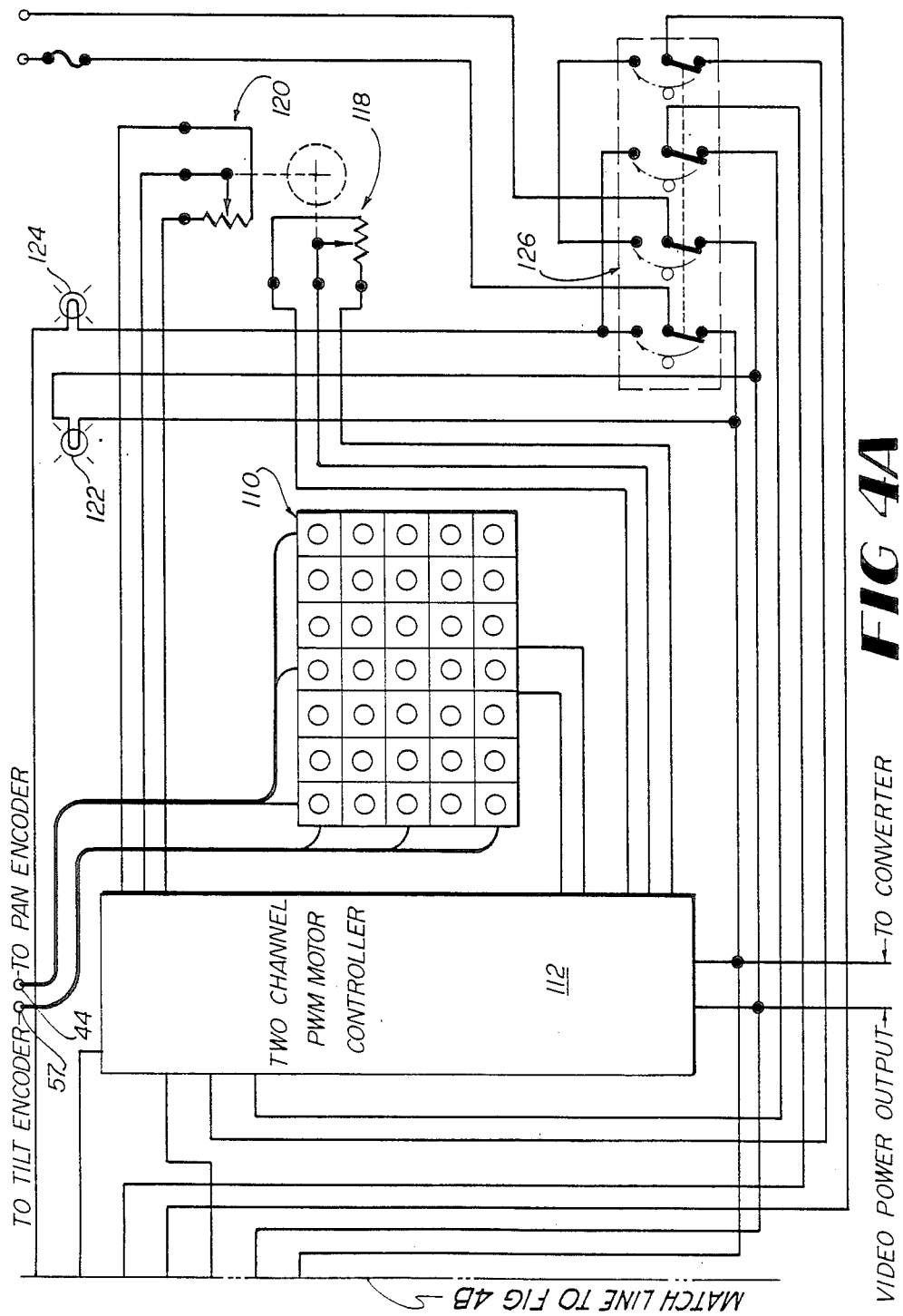

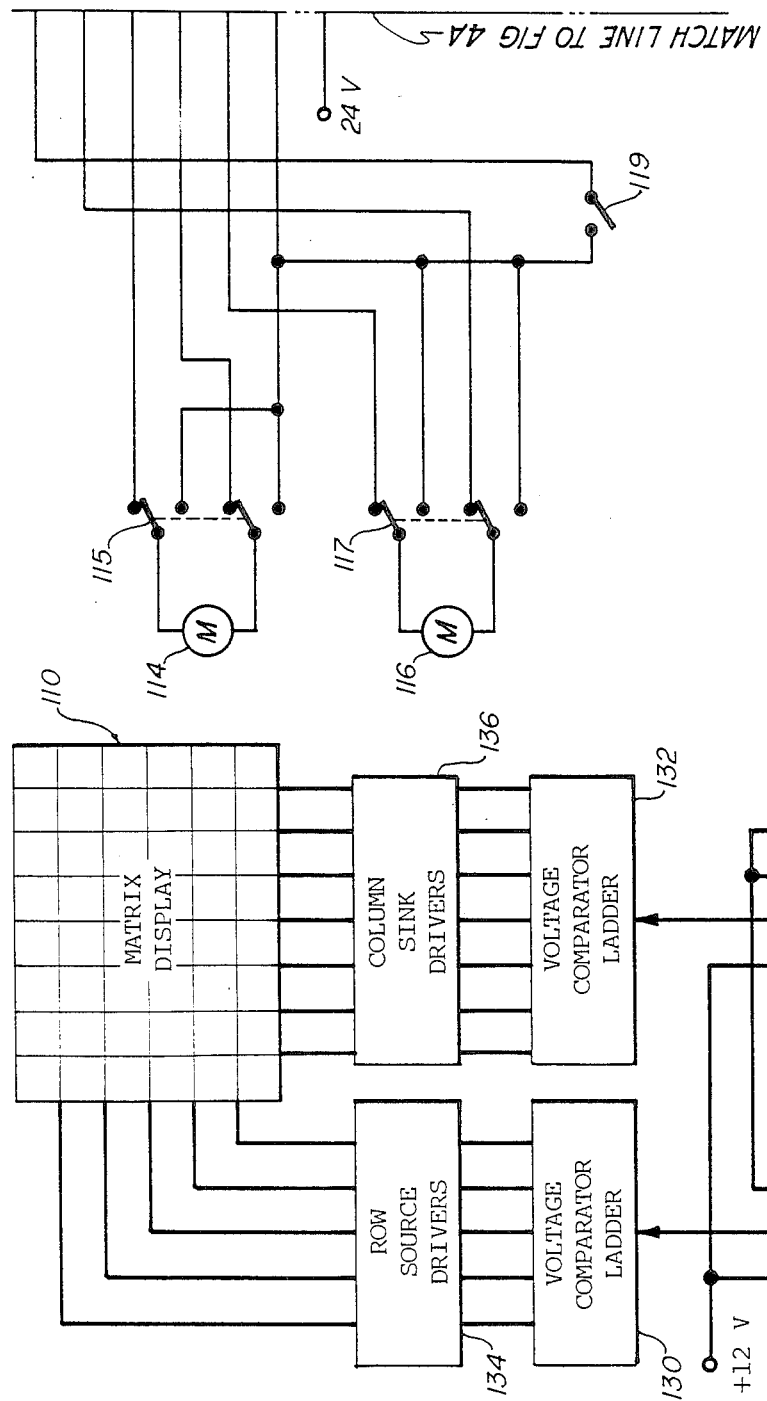

CAMERA MOUNT

BACKGROUND OF THE INVENTION

This invention relates generally to an open camera mount depended from the helicopter at the forward jackpoints beneath the pilot and copilot positions and incorporates variable speed electric tilt and pan control which permits smooth camera motion about the aircraft pitch and yaw axes. Maintaining the stability of an external camera mount is a problem which has been addressed in various ways but never before by the combination of a depending mounting frame within which an inner mount and a camera mount are gimballed. Stabilized platforms for mounting cameras known in the prior art are generally too heavy and cumbersome for use on a helicopter.

The utility of a camera mount that can be carried externally of a helicopter is apparent. A video or movie camera secured to the mount can be used for news or industrial reporting purposes. A video or movie camera so mounted can be used to take a sequence of pictures of any ground condition of interest such as power lines or fruit orchards or to determine the status of construction at a remote industrial facility.

SUMMARY OF THE INVENTION

It is therefore an object of this invention to provide a structure mounted externally to a helicopter that permits, by remote control, the smooth and accurate pan and tilt of a camera attached thereto.

It is a further object of this invention to minimize the vibration of the motion picture or television camera secured to the structure through the use of four vibration-damping units which can be adjusted individually.

It is a further object of this invention to provide an option for an automatic or manual means of controlling the camera horizon during roll maneuvers.

It is another object of this invention to provide a camera mount structure that is inexpensive to manufacture, and that can be easily and quickly attached to or removed from a helicopter or other vehicle.

Referring to FIG. 1, it can be seen that the camera mount includes an open rectangular frame depended from the aircraft and shock braced therefrom. There is a first inner mount of open form gimballed to the frame about a vertical axis and a second inner mount gimballed to the first mount about a horizontal axis. The camera mount is shock mounted to the second inner mount. Separate drive motors are provided for the two axes and a remote control and display are provided inside the cockpit of the aircraft.

BRIEF DESCRIPTION OF THE DRAWINGS

FIG. 3 is an electrical diagram of the remote control assembly on board the helicopter.

FIG. 4 is an electrical diagram of the composite circuit.

FIG. 5 is an electrical diagram illustrating the driving of the matrix display by displacement of the camera mount in the pan and tilt axes.

DETAILED DESCRIPTION OF THE INVENTION

Figure 1:
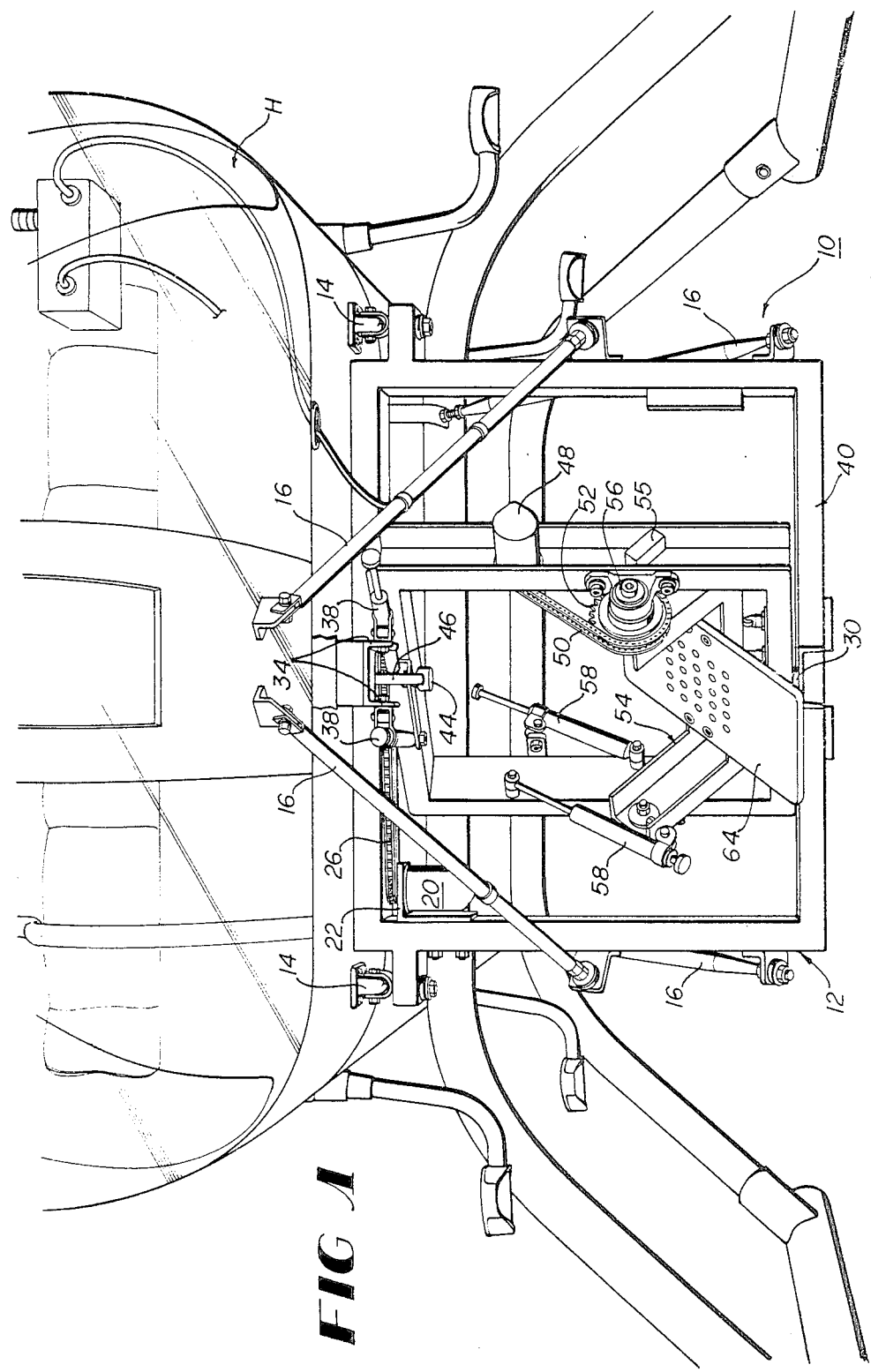
FIG. 1 is a schematic view illustrating the attachment of the camera mount structure to the helicopter frame.

Referring to FIG. 1, the box frame 12 of the camera mount 10 is attached to helicopter H at the left and right forward jackpoints by brackets 14 which are secured by bolts, rubber bushings, washers and self-locking nuts. The box frame 12 is also secured by two forward and two rear support struts 16. The forward and rear support struts are attached to the left and right side of the box frame 12 by rubber bushings, washers and self-locking nuts. The other end of each forward strut 16 is secured to the forward support bracket on the helicopter. The other end of each rear support strut 16 is secured to the forward cross tube saddle (not shown) on the helicopter.

Figure 2:
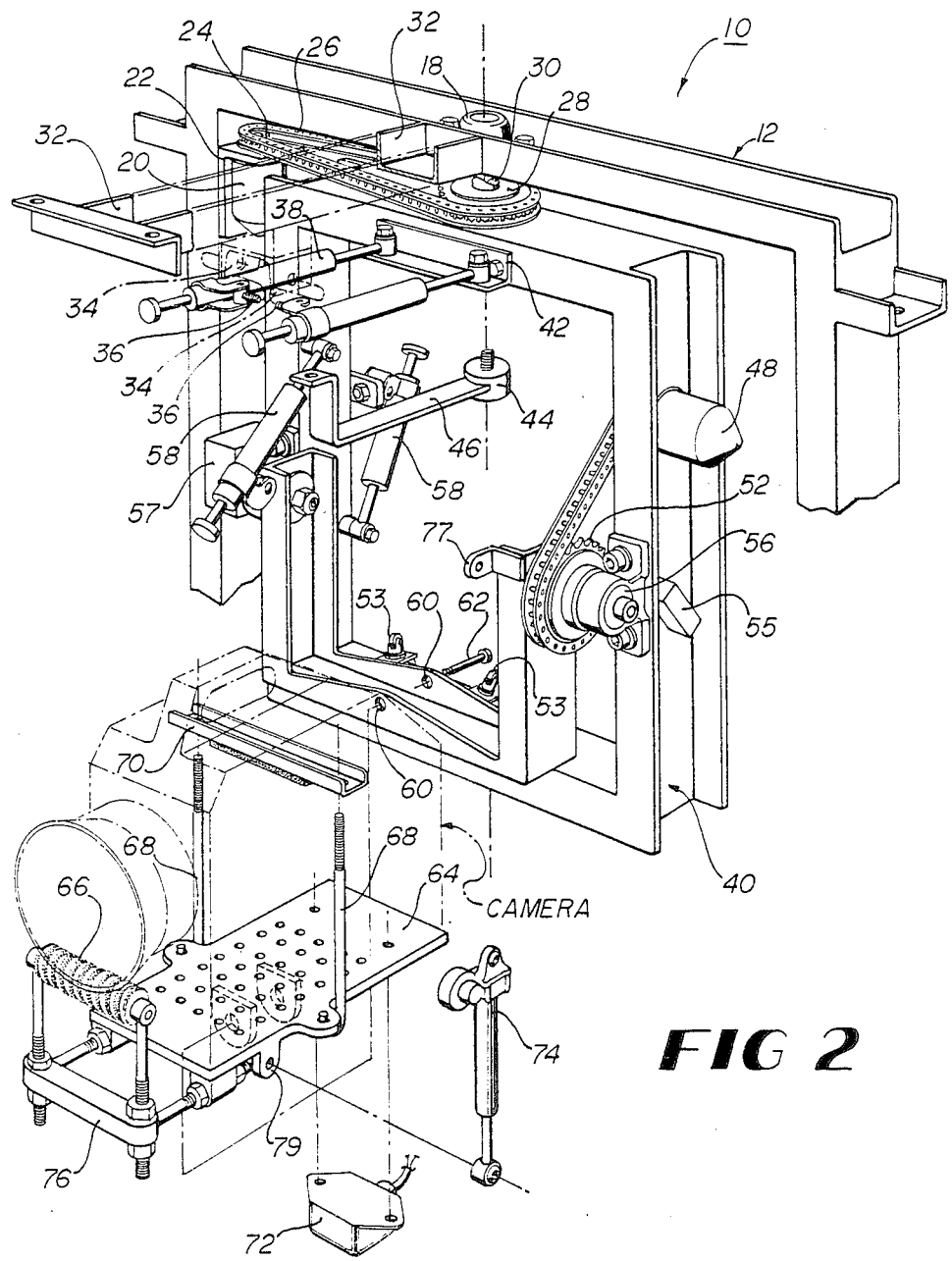
FIG. 2 is a detailed schematic view illustrating the interrelationship of elements comprising the structure of the camera mount.

As shown in FIG. 2, to provide a vertical axis of rotation for the camera mount a pan frame 40 is gimballed vertically to the outer box frame by an upper journal 18 and a lower journal (not shown). The pan frame is driven by servomotor 20 mounted to box frame 12 by motor bracket 22. The motor 20 drives the pan frame 40 through a chain 26 in mesh with the small sprocket 24 mounted on motor 20 and the large sprocket 28 mounted on shaft 30. Extending perpendicularly outward from the box frame is a channel member or tongue 32 which provides a stable base on which to mount dampers 38. Welded to the tongue 32 are damper mounting tabs 34 to which adjustable pan dampers 38 are secured by studs 36. The piston end of the damper or isolator 38 is attached to the pan frame 40 by bracket 42. Rotations of the frame are signalled to a matrix display in the cockpit by a pan encoder or potentiometer 44 secured to the outer frame by stabilizer arm 46. The pan potentiometer 44 provides electrical signals to the matrix display that are proportional to the rotation of the pan frame 40 by crewmember inputs to the pan servomotor 20 to indicate the azimuth direction which the camera is viewing.

An inner U-shaped frame or cradle 54 is used for tilt control of the camera mount and is gimballed horizontally to the pan frame 40. A servomotor 48 for tilt control is fixed to the pan frame 40 as shown in FIG. 2. A tilt drive chain 50 is powered by small sprocket (not shown) mounted to the tilt motor 48 and by a large sprocket 52 which is gimballed to tilt frame 54 by journal 56. Adjustable tilt dampers 58 are fixed to the pan frame 40 and to the cradle 54. Rotation of the cradle 54 about the horizontal is sensed by an encoder or potentiometer 57 which is physically attached to the pan frame 40. The tilt potentiometer 57 generates electrical signals to the cockpit matrix display that are in proportion to the elevation rotation of the tilt frame caused by crewmember inputs to the tilt servomotor 48.

Rotation of the pan frame 40 and tilt frame 54 are limited physically by limit switches 53 and 55 for tilt and left and right limit switches (not shown) mounted to the box frame on the underside of pan frame 40. Up limit switches 53 cut off the tilt servomotor 48 when the cradle 54 is in its horizontal or level position. This is the appropriate position for the cradle 54 during take-offs and landings. Down limit switch 55 cuts off the tilt servomotor 48 when the cradle 54 has been rotated about the horizontal to its maximum depression elevation angle. Although not shown, the pan limit switches fixed to the outer box frame cut off the pan servomotor when the pan frame 40 has been rotated about the vertical to its maximum azimuth angle displacements about the nose of the aircraft.

The camera mount base plate 64 is bolted to the inner tilt frame 54 and contains a series of rows of predrilled holes to facilitate camera mounting. Stability for the actual camera is provided by a clamping bar 70 which is secured by threaded dowels 68 to the tilt frame 54. Additional stability for the camera lens is provided by an adjustable brush 66 bolted to a brush mount 76 which is bolted to the front end of the base plate 64 on which the lens rests.

An alternate embodiment provides not only pan and tilt control of the camera mount but also horizon control as well. This roll stability is provided by a gyroscope 72 attached to the base plate 64 on its underside and connected electrically to a linear actuator 74. Apertures 60 in tilt frame 54 circumscribe a shaft 62 which is supported by journals 75 fixed to the underside of the base plate 64. Electrical signals to control the attitude of the base plate 64 during rolls are generated through linear actuator 74 journalled between bracket 77 on the tilt frame 54 and tab 79 on the camera base plate 64 which is controlled from the cockpit either manually or automatically. Under automatic control, the linear acuator 74 drives the base plate 64 to keep it level based on signals sent to it by the attitude-sensing gyroscope 72. Under manual control signals to the linear actuator 74 to control the horizon are provided directly from the remote control panel and the gyroscope 72 is bypassed.

The two channel pan and tilt motor controller in the cockpit has the electrical schematic shown in FIG. 3. The controller technology is conventional in the art. Electrical power supply 80 is provided from the helicopter's generators. The 120 Hz sawtooth generator 88 provides a sawtooth wave reference for varying the speed of the pan and tilt motors. The level shifting buffer 90 provides a dc bias point to the level of the sawtooth wave. The pan input 82 provided by the crewmember through a rotary potentiometer (joystick) on the control panel is directed to the X-axis controller 92. The tilt input 84 which is controllable by the same rotary potentiometer used to pan sends electrical signals to the Y-axis controller 94. Based on the pan and tilt inputs, the X-axis controller 92 and Y-axis controller 94 provide directional and speed signals to the X-axis motor driver 100 and the Y-axis motor driver 102 after first being buffered at X-axis buffer 96 and Y-axis buffer 98 respectively. The buffers 96 and 98 consist of operational amplifiers and convert a high impedance imput to a low impedance output so that the pan and tilt potentiometers are not overloaded. The X-axis electrical output 104 is sent to the pan on servomotor 20 depicted in FIG. 2. The Y-axis electrical output 106 is sent to the tilt motor 48 also depicted in FIG. 2.

FIG. 4 shows the overall electrical schematic including pan and tilt motors 116 and 114 respectively, the two-channel motor controller 112, the matrix display 110 on the cockpit control panel, and the pan and tilt inputs 118 and 120 to the motor controller 112. The figure further shows the power-on lamp 122 and safe to land lamp 124 on the cockpit control box, and a four-pole double-throw switch 126 to complete the electrical circuit from the motor controller 112 to the pan and tilt motors 116 and 114. When the switch 126 on the control panel is in the "on" position, pan and tilt inputs 118 and 120 are buffered by the 2-channel motor controller 112 and then sent to the pan and tilt motors 116 and 114. While switch 126 is in the "on" position, lamp 122 is illuminated. When the switch 126 is in the "land" position, tilt motor 114 drives the cradle up to the horizontal or level position. The motor controller 112 also provides power output to a converter to power a television display of the video camera's picture. Also shown in FIG. 4 are the electrical leads from the tilt and pan potentiometer to the matrix display 110 to illuminate a cell in the display corresponding to the pan and tilt positions of the camera mount.

Referring to FIG. 5 the pan potentiometer 44 and the tilt potentiometer 57 generate a voltage output proportional to the displacement of the pan frame in azimuth and the tilt frame or cradle in elevation, respectively. The pan potentiometer voltage output is compared to an adjustable reference voltage by the pan voltage comparator resistor ladder 130 which is then input to a pan row source driver 134 to determine which row in the matrix display to provide with a high voltage. Similarly, the tilt voltage comparator resistor ladder 132 compares the tilt potentiometer's voltage output and compares it to an adjustable reference voltage and outputs a signal to the tilt column sink driver 136 which will set one output line to the matrix display low. The cell illuminated in the 5 by 7 matrix display will correspond to that element having both a high row source voltage and a low column sink voltage applied to it.

The invention has been described by way of preferential embodiments only and equivalents to any of its component elements can be substituted without departing from the scope of the invention. Although the specification sets forth a description in terms of an application onboard a helicopter, the invention is equally applicable to any appropriate fixed wing aircraft or to any land-based vehicle where freedom of movement about one or more axes of rotation is essential to the installation. Thus the following claims are directed to a vehicle to reflect this more general application.

What is claimed is:

1. A camera mount connected externally of a vehicle to carry a camera for photography of scenery of interest comprising:
    an outer frame attached to the vehicle;
    an inner frame gimballed vertically to the outer frame and rotatable in azimuth about a vertical axis;
    a cradle gimballed horizontally to the inner frame and rotatable in elevation about a horizontal axis;
    a base plate fixed to the cradle for securing said camera thereto;
    a remotely controlled rotational means for regulating the displacement of the inner frame in azimuth, and for regulating the displacement of the cradle in elevation;
    a plurality of support struts having a first end attached to said outer frame and having a second end secured to the vehicle;
    an azimuth displacement sensing means fixed to said inner frame;
    an elevation displacement sensing means fixed to said cradle;
    channel means oriented horizontally and extending perpendicularly outward from said outer frame and having a first end attached to said outer frame and having a second end attached to the vehicle;
    pan vibration damping means having one end attached to said inner frame and having an opposing end fixed to said channel means;

tilt vibration damping means having a first end attached to said inner frame and a second end attached to said cradle;
a remote control circuit board located in the cockpit of said vehicle and connected electrically to said remotely controlled rotational means to allow manual pan and tilt directional control of said camera mount;
an indicator display located in the cockpit of said vehicle and connected electrically to said azimuth sensing means and said elevation sensing means to indicate the axial directions in which said externally mounted camera is aimed;
a television monitor located in the cockpit of said vehicle and electrically connected to said externally mounted camera for viewing the scenery being photographed;
whereby said camera mount can be directed to pan and tilt by remote control and thereby said camera can photograph scenes of interest.

2. The camera mount of claim 1 wherein the remotely controlled rotational means further comprises:
a first servomotor electrically connected to said remote control circuit board and fixed to said outer frame;
a plurality of horizontal oriented sprockets including a first smaller sprocket axially connected to said first servomotor and a second larger sprocket fixed to said inner frame;
a shaft gimballed vertically for mounting said second horizontally oriented sprocket to said inner frame;
a first chain attached to said horizontally oriented sprockets for transmitting rotational movement in azimuth to the inner frame;
a second servomotor electrically connected to said remote control circuit board and fixed to said inner frame;
a plurality of vertically oriented sprockets including a first smaller sprocket axially connected to said second servomotor and a second larger sprocket fixed to said cradle;
a shaft gimballed horizontally for mounting said second vertically oriented sprocket to said cradle;
a second chain attached to said vertically oriented sprockets for transmitting rotational movement in elevation to said cradle.

3. The camera mount of claim 1 wherein the azimuth displacement sensing means comprises a rotary potentiometer fixed to said vertically gimballed shaft and connected electrically to said indicator display.

4. The camera mount of claim 1 wherein the elevation displacement sensing means comprises a potentiometer fixed to said cradle and connected electrically to said indicator display.

5. The camera mount of claim 1 wherein the tilt vibration damping means consists of a plurality of cylindrical piston dampers.

6. The camera mount of claim 5 wherein said cylindrical piston dampers further comprises:
a front damper having a piston end secured to said inner frame;
a rear damper having a piston end secured to said cradle.

7. The camera mount of claim 1 wherein the pan vibration damping means consists of a plurality of cylindrical piston dampers.

8. The camera mount of claim 7 wherein said cylindrical piston dampers have a piston end attached to said inner frame.

9. A camera mount connected externally of a vehicle to carry a camera for photography of scenery of interest comprising:
an outer frame attached to the vehicle;
an inner frame gimballed vertically to the outer frame and rotatable in azimuth about a vertical axis;
a cradle gimballed horizontally to the inner frame and rotatable in elevation about a horizontal axis;
a base plate fixed to the cradle for securing said camera thereto;
a remotely controlled rotational means for regulating the displacement of the inner frame in azimuth, and for regulating the displacement of the cradle in elevation;
a plurality of support struts having a first end attached to said outer frame and having a second end secured to the vehicle;
an azimuth displacement sensing means fixed to said inner frame;
an elevation displacement sensing means fixed to said cradle;
channel means oriented horizontally and extending perpendicularly outward from said outer frame and having a first end attached to said outer frame and having a second end attached to the vehicle;
pan vibration damping means having one end attached to said inner frame and having an opposing end fixed to said channel means;
tilt vibration damping means having a first end attached to said inner frame and a second end attached to said cradle;
a remote control circuit board located in the cockpit of said vehicle and connected electrically to said remotely controlled rotational means to allow manual pan and tilt directional control of said camera mount;
an indicator display located in the cockpit of said vehicle and connected electrically to said azimuth sensing means and said elevation sensing means to indicate the axial directions in which said externally mounted camera is aimed;
a television monitor located in the cockpit of said vehicle and electrically connected to said externally mounted camera for viewing the scenery being photographed;
a roll sensing means fixed to said base plate;
a linear actuator having one end journalled to said cradle and an opposite end attached to said base plate;
whereby said camera mount can be directed to pan and tilt by remote control and said base plate carrying said camera can be kept level either automatically or manually by remote control during the photography of scenes of interest.

10. The camera mount of claim 9 wherein the remotely controlled rotational means further comprises:
a first servomotor electrically connected to said remote control circuit board and fixed to said outer frame;
a plurality of horizontal oriented sprockets including a first smaller sprocket axially connected to said first servomotor and a second larger sprocket fixed to said inner frame;
a shaft gimballed vertically for mounting said second horizontally oriented sprocket to said inner frame;

a first chain attached to said horizontally oriented sprockets for transmitting rotational movement in azimuth to the inner frame;

a second servomotor electrically connected to said remote control circuit board and fixed to said inner frame;

a plurality of vertically oriented sprockets including a first smaller sprocket axially connected to said second servomotor and a second larger sprocket fixed to said cradle;

a shaft gimballed horizontally for mounting said second vertically oriented sprocket to said cradle;

a second chain attached to said vertically oriented sprockets for transmitting rotational movement in elevation to said cradle.

11. The camera mount of claim 9 wherein the azimuth displacement sensing means comprises a rotary potentiometer fixed to said vertically gimballed shaft and connected electrically to said indicator display.

12. The camera mount of claim 9 wherein the elevation displacement sensing means comprises a potentiometer fixed to said cradle and connected electrically to said indicator display.

13. The camera mount of claim 9 wherein the tilt vibration damping means consists of a plurality of cylindrical piston dampers.

14. The camera mount of claim 13 wherein said cylindrical piston dampers further comprises:

a front damper having a piston end secured to said inner frame;

a rear damper having a piston end secured to said cradle.

15. The camera mount of claim 9 wherein the pan vibration damping means consists of a plurality of cylindrical piston dampers.

16. The camera mount of claim 15 wherein said cylindrical piston dampers have a piston end attached to said inner frame.

17. The camera mount of claim 9 wherein the roll-sensing means comprises a gyroscope.

* * * * *